United States Patent [19]

Tateishi

[11] Patent Number: 5,636,197
[45] Date of Patent: Jun. 3, 1997

[54] FEEDBACK SERVO FOR BEAM POWER CONTROL, TRACKING CONTROL AND FOCUS CONTROL IN AN OPTICAL DISK RECORDING SYSTEM

[75] Inventor: Kiyoshi Tateishi, Tsurugashima, Japan

[73] Assignee: Pioneer Electronic Corporation, Tokyo, Japan

[21] Appl. No.: 490,178

[22] Filed: Jun. 15, 1995

[30] Foreign Application Priority Data

Jun. 20, 1994 [JP] Japan ................................. 6-137461

[51] Int. Cl.⁶ ..................................................... G11B 7/00
[52] U.S. Cl. ................... 369/124; 369/44.34; 369/44.35
[58] Field of Search ..................................... 369/116, 124, 369/100, 53, 54, 58, 59, 47, 48, 49, 60, 44.25, 44.27, 44.28, 44.29, 44.32, 44.34, 44.35

[56] References Cited

U.S. PATENT DOCUMENTS

| | | | |
|---|---|---|---|
| 4,879,707 | 11/1989 | Getreuer et al. | 369/44.28 |
| 5,361,244 | 11/1994 | Nakamura et al. | 369/44.34 X |
| 5,495,463 | 2/1996 | Akagi et al. | 369/116 |

*Primary Examiner*—Muhammad N. Edun
*Attorney, Agent, or Firm*—Sughrue, Mion, Zinn Macpeak & Seas

[57] ABSTRACT

A beam power control apparatus comprising a beam generator for emitting a recording beam, a detector for detecting the light intensity of the recording beam and generating the corresponding detection signal, a sample pulse generator to generate a sample pulse corresponding to the duration holding a lower and/or higher level in an information signal being recorded, sample-and-hold circuit for sample-and-holding the detection signal in response to the sample pulse, and feedback control system for controlling the light intensity of the recording beam taking a lower and/or higher level constant in accordance with the detection signal sample-and-held. The sample pulse generator stops the generation of the sample pulse if the duration of the holding lower and/or higher levels of the information signal is shorter than a predetermined time length. The beam power control apparatus described above enables acceleration of the bit rate of the information signal independently on the improved response of the circuits and the elements such as the sampling circuit and the light power detecting system.

9 Claims, 7 Drawing Sheets

FEEDBACK SERVO FOR BEAM POWER CONTROL, TRACKING CONTROL AND FOCUS CONTROL IN AN OPTICAL DISK RECORDING SYSTEM

BACKGROUND OF THE INVENTION

1. Field of the Invention

This invention relates to an optical disk recording system which records an information signal on an optical disk by the presence and absence of a pit and the length of a pit, and in particular to feedback servo for beam power control, tracking control and focus control in that system.

2. Description of the Prior Arts

Japanese Patent Kokai No. 61-16044 discloses such a beam power control apparatus as described above.

Figure 1:
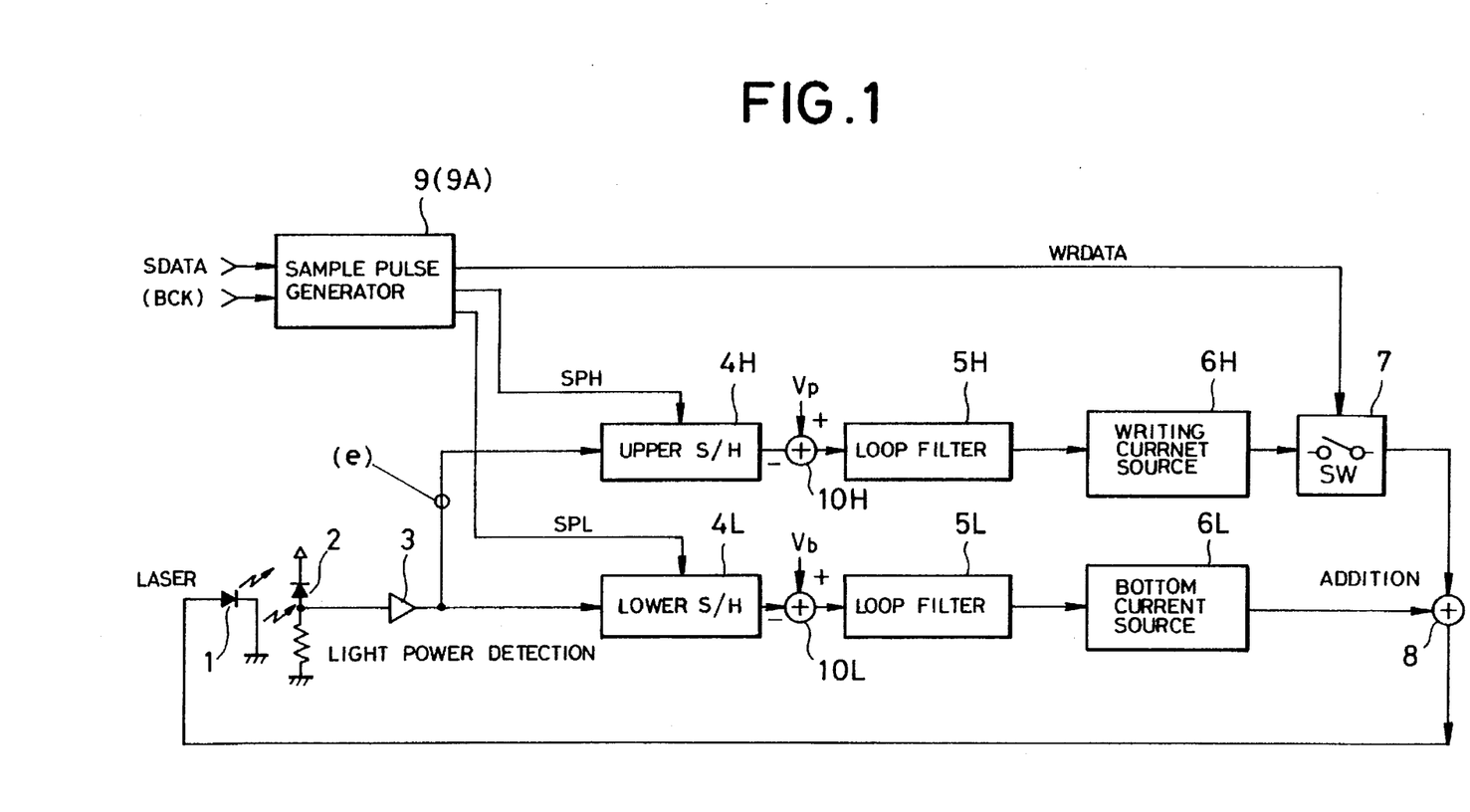
FIG. 1 is a functional block diagram showing one embodiment of a beam power control apparatus for writing on an optical disk.

FIG. 1 is a block diagram which shows a beam power control apparatus having substantially the same construction as that apparatus.

Referring to FIG. 1, a semiconductor laser 1 as beam generating means is provided in a recording head for an optical disk, and emits an optical beam for recording on the optical disk. The emitted light intensity from the laser 1 is detected by writing light intensity detecting means. The writing light intensity detecting means includes an internal light receiving element in the laser unit (a laser module with a monitoring output terminal) such as a photodiode, or an external light receiving element which is provided with an optical receiving path through an optical system (not shown). A light receiving output of the photodiode 2 is supplied to each of an upper sample-and-hold circuit 4H and a lower sample-and-hold circuit 4L through an amplifier 3 as a detection signal.

The detection signal is sample-and-held by the upper sample-and-hold circuit 4H, and then supplied to a negative input terminal of a subtracter 10H. A reference signal Vp having a predetermined higher level is applied to a positive input terminal of the subtracter 10H. The reference signal establishes a target value for the upper servo control, i.e. the level corresponding to the peak value of the emitting light intensity of the laser 1 which should be kept constant. The subtracter 10H subtracts the detection signal from the reference signal. The output of the subtracter 10H is then supplied to a writing current source 6H through a loop filter 5H. The current source 6H supplies an electric current to one terminal of an adder 8 through a switching circuit 7 in accordance with the output level of loop filter 5H. The current has the level corresponding to that of the detection signal which is sample-and-held by sample-and-hold circuit 4H.

On the other hand, the detection signal which is sample-and-held by the lower sample-and-hold circuit 4L is supplied to a negative input terminal of a subtracter 10L. A reference signal Vb having a predetermined lower level is applied to a positive input terminal of the subtracter 10L. The reference signal establishes a target value for the lower servo control i.e. the level corresponding to the bottom value of the emitting light intensity of the laser 1 which should be kept constant. The subtracter 10L subtracts the detection signal from the reference signal. The output of the subtracter 10L is supplied to a bottom current source 6L through a loop filter 5L. The current source 6L supplies an electric current to the other terminal of the adder 8 in accordance with the output level of loop filter 5L. The current has the level corresponding to that of the detection signal which is sample-and-held by sample-and-hold circuit 4L.

The added output from the adder 8 is supplied to the laser 1 as a driving signal.

A sample pulse generator 9 generates sample pulses SPH and SPL which decide the sampling timings of the upper and lower sample-and-hold circuits 4H and 4L. The sample pulse generator 9 produces not only sample pulses SPH, SPL but also a writing signal WRDATA based on an original writing signal SDATA functioning as an information signal which should be recoded. The sample pulses SPH, SPL correspond to each of the runs (lower and higher level holding durations) of the writing signal. The writing signal WRDATA is supplied to the switching circuit 7 as a switching control signal, that is, the writing signal WRDATA causes the laser 1 to turn on or off for recording.

Figure 2:
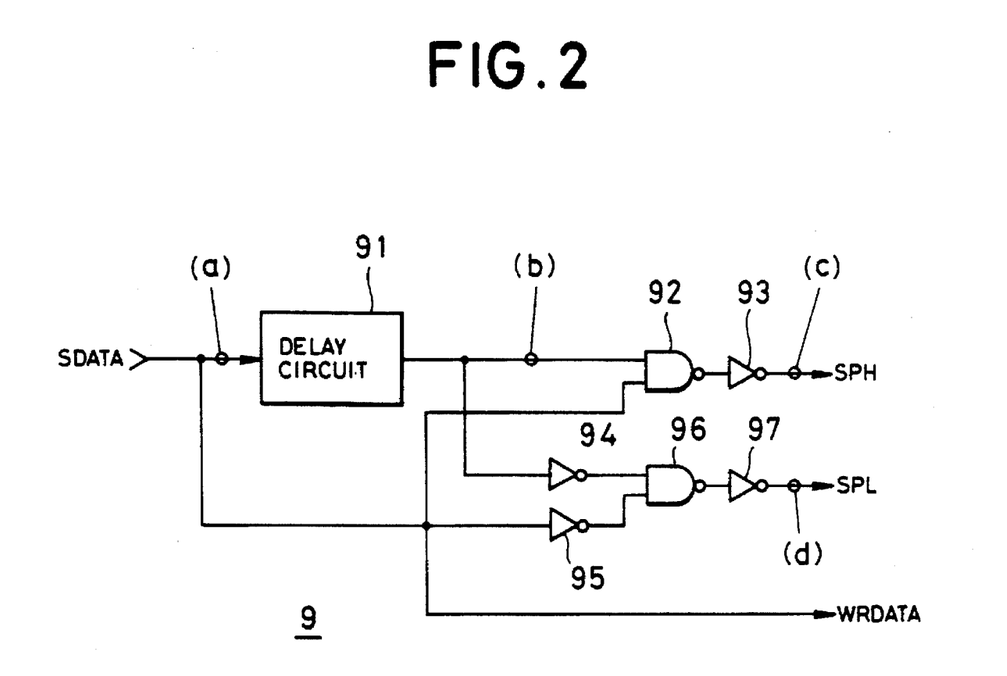
FIG. 2 is a block diagram showing a conventional sample pulse generator 9 used in the apparatus of FIG. 1.

FIG. 2 illustrates a block diagram showing the details of the structure of the above sample pulse generator 9, in which a writing original signal (original writing pulse) SDATA supplied serially is delayed by a delay circuit 91 and then supplied to one terminal of a NAND gate 92. To the other terminal of the NAND gate 92 the undelayed writing original signal SDATA is supplied directly. An output of the NAND gate 92 passes through an inverter 93 and becomes an input sample pulse SPH of the upper sample-and-hold circuit 4H. The writing original signal delayed by the delay circuit 91 also is supplied to one terminal of a NAND gate 96 through an inverter 94. To the other terminal of the NAND gate 96, the undelayed writing original signal SDATA is supplied through an inverter 95. An output of the NAND gate 96 passes through an inverter 97 and then become an input sample pulse SPL of the lower sample-and-hold circuit 4L. The writing original signal SDATA is taken as a writing signal WRDATA by itself.

Figure 3:
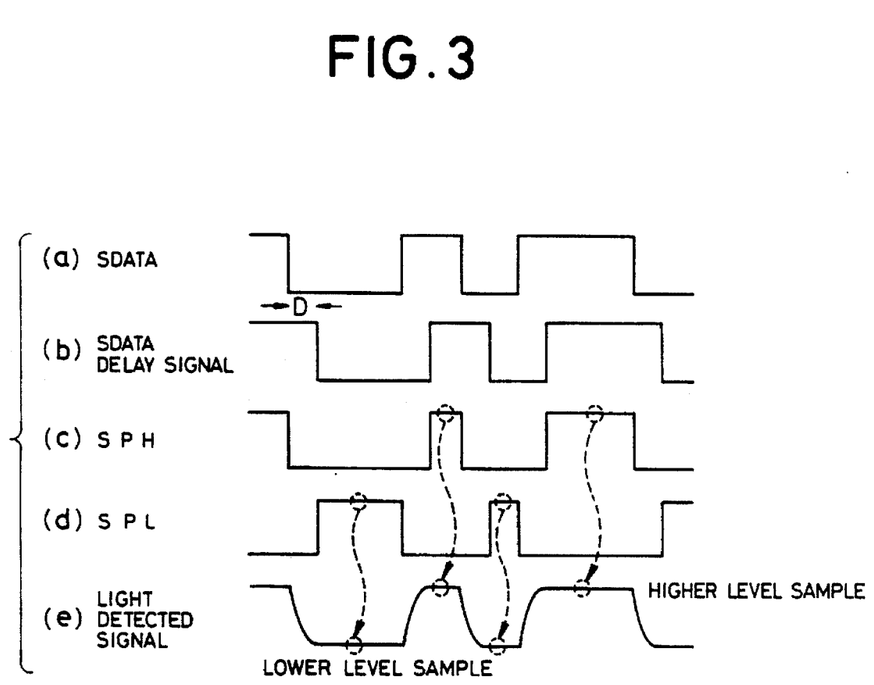
FIG. 3 is a timing diagram showing the operational waveform of each of the points in the conventional beam power control apparatus for writing on an optical disk shown in FIGS. 1 and 2.

FIG. 3 illustrates a timing diagram of the operation of the beam power control apparatus described above.

The writing original signal SDATA shown in (a) of FIG. 3 consists of a rectangular wave signal which takes either predetermined lower or higher levels alternatively, which is delayed by the delay circuit 91, so that it comes to have a predetermined delay width D, as shown in (b) of FIG. 3. The logical circuits 92–97 perform logical conjunctions these delayed and undelayed signals, then the upper sample pulse SPH and the lower sample pulse SPL are obtained as shown in (c) and (d) of FIG. 3. If the output detection signal from the sensor amplifier 3 has a waveform like that shown in (e) of FIG. 3 in response to the writing original signal of (a) of FIG. 3, the upper sample pulse SPH and the lower sample pulse SPL cause the upper and lower sample-and-hold circuits 4H and 4L to sample-and-hold the higher and lower levels of the detection signal, respectively.

Described above, after the detection signal sample-and-held is supplied to each of the subtracters 10H and 10L and is then subtracted from the reference signals respectively, each of the signals corresponding to resultant differences of the subtraction is supplied to the writing current source 6H and the bottom current source 6L through the loop filters 5H and 5L, respectively, so that each of the current sources can generate a driving current flow which will keep the laser power constant. In other words, if the switching circuit 7 is turned on when the writing original signal SDATA takes the higher level, a driving current flow is applied to the laser 1 in the manner that all of the laser 1, the photodiode 2, the amplifier 3, the upper sample-and-hold circuit 4H, the subtracter 10H, the loop filter 5H, the writing current source 6H and the adder 8 provide a servo loop and that the laser emitting light intensity corresponding to the level of the reference signal Vp should keep constant. If the switching circuit 7 is turned off when the writing original signal SDATA takes the lower level, a driving current flow is applied to the laser 1 in the manner that all of the laser 1, the photodiode 2, the amplifier 3, the lower sample-and-hold circuit 4L, the subtracter 10L, the loop filter 5L, the bottom current source 6L and the adder 8 provide a servo loop and that the laser emitting light intensity corresponding to the level of the reference signal Vb should keep constant.

In the feedback control system for the laser beam intensity described above, the higher bit rate of the writing pulse (writing original signal), it becomes more necessary for the sampling circuit and the light power detecting system (including the photodiode 2 and the sensor amplifier 3) to improve the response (high frequency characteristic).

However, to improve the responses of the individual circuit and element has a limit, so that it is expected that a quite novel technology would enable the fast acceleration of the writing pulse bit rate.

SUMMARY OF THE INVENTION

The main object of the present invention is to provide a feedback servo for beam power control, tracking control and focusing control for writing on an optical disk, each of which can follow the acceleration of the bit rate of writing pulses independently on the improved response of the circuits and the elements such as a sampling circuit and a light beam detecting system.

A beam power control apparatus for an optical disk recording system according to the present invention comprises beam generating means for emitting a recording beam irradiating onto an optical disk; detecting means for detecting the light intensity of said recording beam and supplying the corresponding detection signal; sample pulse generating means for determining the length of a duration of at least one of a lower level condition and a higher level condition in an information signal being recorded, said sample pulse generating means for generating a sample pulse corresponding to said durations only if it is determined that said duration is longer than a predetermined time length; sample-and-hold means for sample-and-holding said detection signal in response to said sample pulse; and feedback control means for controlling the light intensity of at least one of the lower level condition and higher level condition of said recording beam, depending on said detection signal sample-and-held by said sample-and-hold means.

A tracking control apparatus for an optical disk recording system according to the present invention comprises beam generating means for emitting a recording beam irradiating on an optical disk; detecting means for detecting a tracking error of said recording beam associated with a recording track on said optical disk to generate a corresponding error signal; sample pulse generating means for determining the duration of a lower level condition or a higher level condition in an information signal being recorded, said sample pulse generating means for generating a sample pulse corresponding to said duration only if it is determined that the length of said duration is longer than a predetermined time length; sample-and-hold means for sample-and-holding said error signal in response to said sample pulse; and feedback control means for controlling the tracking of said recording beam based on said error signal sample-and-held by said sample-and-hold means.

A focusing control apparatus for an optical disk recording system according to the present invention comprises beam generating means for emitting a recording beam irradiating on an optical disk; detecting means for detecting a focus error of said recording beam associated with a recording face on said optical disk to generate a corresponding error signal; sample pulse generating means for determining the duration of a lower level condition or a higher level condition in an information signal being recorded, said sample pulse generating means for generating a sample pulse corresponding to said duration only if it is determined that said duration is longer than a predetermined time length; sample-and-hold means for sample-and-holding said error signal in response to said sample pulse; and feedback control means for controlling the focusing of said recording beam based on said error signal sample-and-held by said sample-and-hold means.

According to the above apparatus, the supply of the sample pulse to the sample-and-hold circuit in the beam power, tracking or focusing servo loop pauses when it is determined that the duration (so-called run) to have the lower and/or higher level of a writing signal (the above information signal) is shorter than a predetermined time length.

Other and further features, advantages, and benefits of the invention will become apparent in the following description taken in conjunction with the following drawings. It is to be understood that the foregoing generally description and the following detailed description are exemplary and explanatory but are not be restrictive of the invention. The accompanying drawings which are incorporated in and constitute a part of this invention, illustrate one of the embodiments of the invention and, together with the description, serve to explain the principles of the invention in general terms.

DETAILED DESCRIPTION OF THE PREFERRED EMBODIMENTS

The details of the preferred embodiments according to the present invention becomes apparent referring to the drawings.

Figure 4:
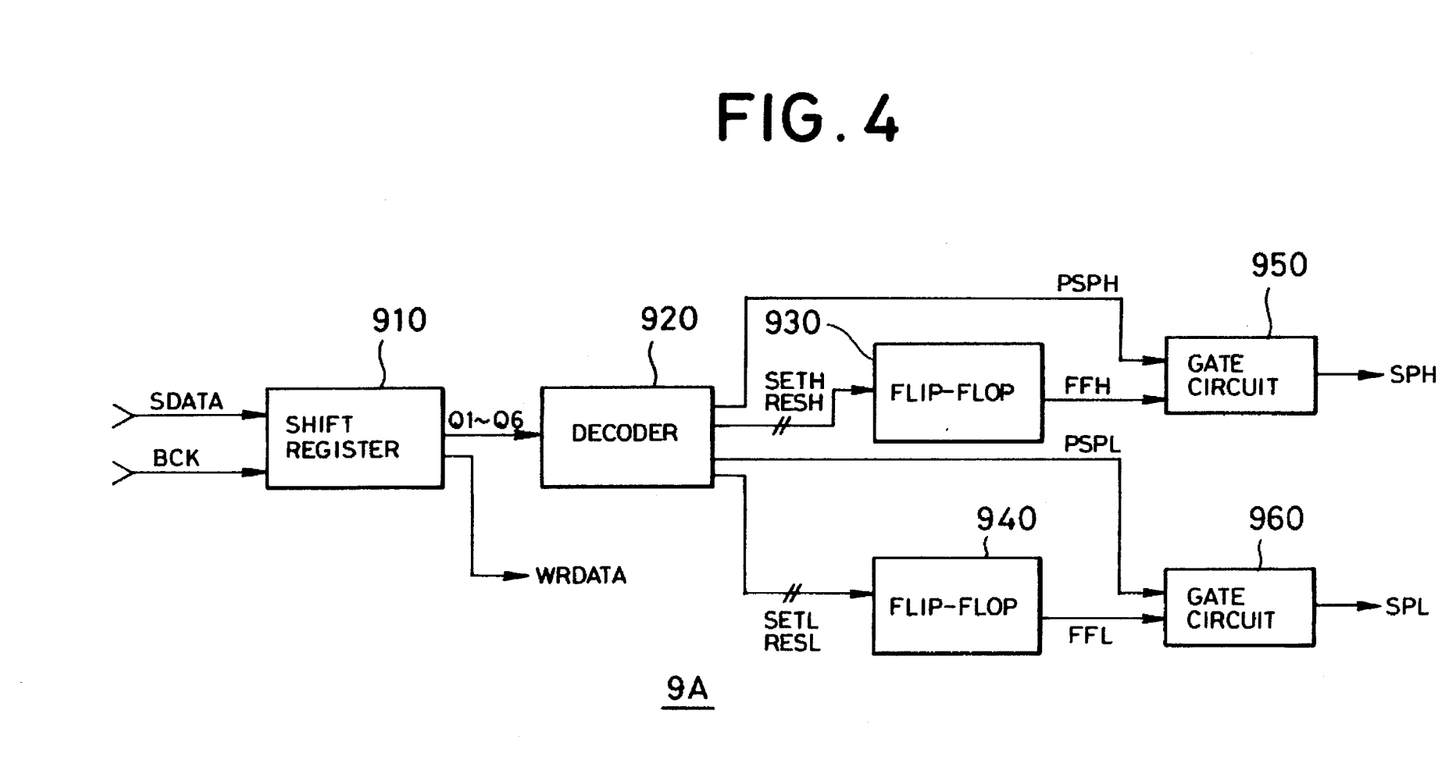
FIG. 4 is a block diagram showing one embodiment of the sample pulse generator 9A according to the present invention.

FIG. 4 illustrates a block diagram showing one embodiment of a sample pulse generator used in a beam power control apparatus for writing on an optical disk according to the present invention, in which the similar portion to that of FIG. 1 is indicated with the same reference character. The beam power control apparatus for writing on an disk which utilizes the sample pulse generator 9A in the present embodiment includes the other blocks shown in FIG. 1, so that the detailed description of the common constituents of FIG. 4 to those of FIG. 1 are eliminated.

Referring to FIG. 4, the sample pulse generator 9A includes a shift resistor 910 consisting of a plurality of unit resistors connected in series. The shift resistor 910 holds and shifts in turn every bit of a serial-input writing original signal SDATA in each of the unit resistors in response to a bit clock BCK. The output of each of the resistors goes to a decoder 920. The decoder 920 produces signals (sample timing candidate signals) presenting a sample timing which corresponds to each of the upper (higher level segment) and lower (lower level segment) runs of an output writing signal WRDATA in accordance with stored contains in each of the resistors. Furthermore, the decoder 920 determines whether the length of the run of the writing original signal SDATA i.e. writing pulse is smaller than a predetermined duration, and generates signals (run length detection signals) which would be effective only when the run is smaller than the predetermined duration. This run length detection signals become set signals for flip-flops 930 and 940. The decoder 920 then generates reset signals to clear the condition set by the set signals.

The sample timing candidate signals from the decoder 920 becomes one of inputs to gate circuits 950 and 960 individually. The outputs of the flip-flop 930 and 940 are the signals prohibiting the output of the candidate signals, and supplied to the other input of each the gate circuits 950 and 960, respectively. The output signals of the gate circuits 950 and 960 are the sample pulses SPH and SPL supplied to the upper and lower sample-and-hold circuits 4H and 4L.

Figure 5:
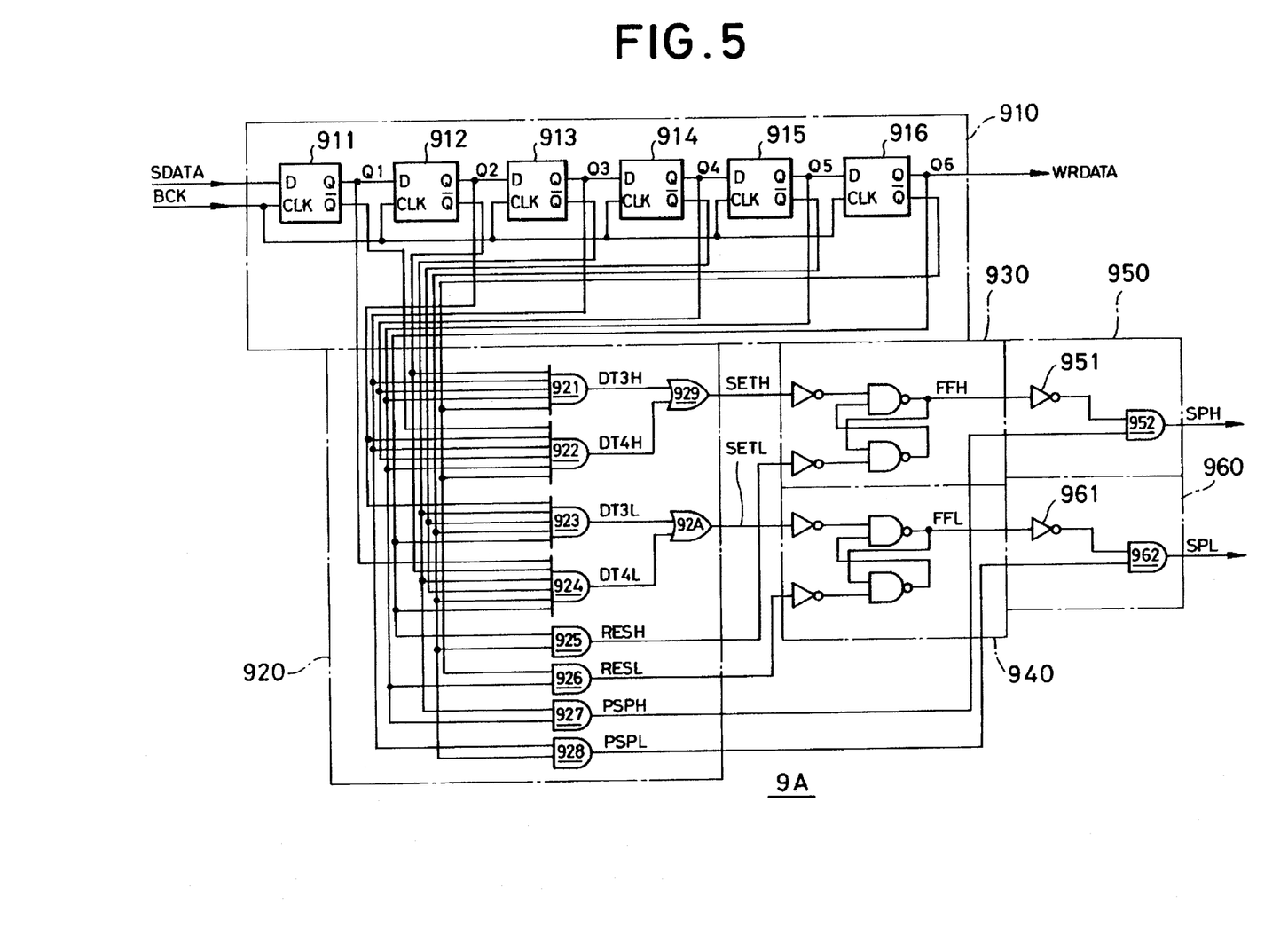
FIG. 5 is a detailed block diagram showing the sample pulse generator 9A of FIG. 4.

FIG. 5 illustrates the further detailed block diagram of the sample pulse generator 9A, in which the similar component to that of FIG. 4 is indicated with the same reference character.

Referring to FIG. 5, the shift resistor 910 includes unit registers, that is, six D-type flip-flops 911–916 connected in series. Each of the flip-flops takes a bit clock BCK as the common clock input. The output writing signal WDATA is made of the signal which is held and shifted by these flip-flops and then passed through the sixth stage flip-flop 916. Each of the outputs Q1–Q6 of the flip-flops and their inverted outputs are supplied to the decoder 920. The decoder 920 consists of AND and OR gates 921–92A and serves to decode the held outputs Q1–Q6 and their inverted outputs.

The output DT3H from the AND gate 921 has a higher level when the writing original signal SDATA having the run with the higher level during a shorter period corresponding to three cycles of the bit clock BCK is supplied to the shift register 910. The output DT4H from the AND gate 922 takes a higher level when the writing original signal SDATA having the run with a higher level during a shorter period corresponding to four cycles of the bit clock BCK is supplied to the shift register 910. Furthermore, the output DT3L from the AND gate 923 takes a higher level when the writing original signal SDATA having the run with the lower level during a shorter period corresponding to three cycles of the bit clock BCK is supplied to the shift register 910. The output DT4L from the AND gate 924 takes a higher level when the writing original signal SDATA having the run with a lower level during a shorter period corresponding to four cycles of the bit clock BCK is supplied to the shift register 910. Accordingly, the output SETH from the OR gate 929 having been supplied with the signals DT3H, DT4H has a higher level when the higher level continuing duration of the writing original signal SDATA is shorter than a predetermined time length. The output SETL from the OR gate 92A having been supplied with the signals DT3L, DT4L has a higher level when the lower level continuing duration of the writing original signal SDATA is shorter than the predetermined time length. These outputs constitute the run length detection signals described above.

The run length detection signals SETH, SETL having higher levels cause the flip-flops 930, 940 to be introduced into the set conditions. Then, after a suitable time period has passed, the outputs RESH, RESL from the gates 925, 926 having higher levels cancel the set conditions. The flip-flops generate prohibiting signals FFH, FFL having a higher level during the set period.

The outputs PSPH, PSPL from the AND gates 927, 928 are supplied to the inputs of the AND gates 952, 962 as sample pulse candidate signals being supplied to the upper and lower sample-and-hold circuits 4H, 4L. Then, at the AND gates 952, 962, the supply of the passing outputs from the inverters 951,961 having been supplied with the prohibiting signals FFH, FFL causes the sample pulse candidate signals PSPH, PSPL to be passed. In other words, if the prohibiting signals FFH, FFL have a higher level, the output of the sample pulse candidate signals PSPH, PSPL is blocked, if the prohibiting signals FFH, FFL have a lower level, the only sample pulse signals which have passed through the gates 952, 962 become the input sample pulses SPH, SPL of each of the sample-and-hold circuits.

Figure 6:
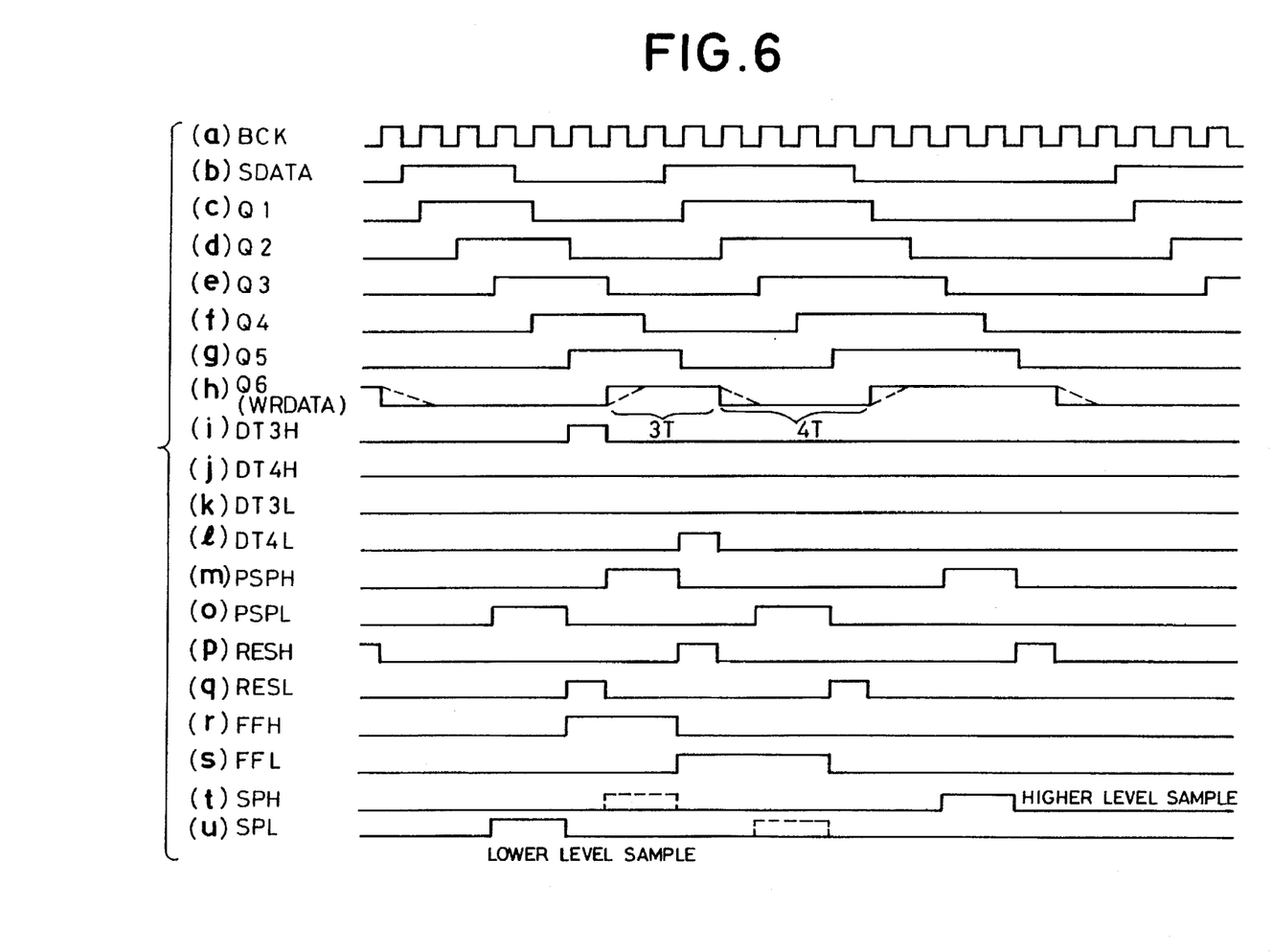
FIG. 6 is a timing diagram showing each of the waveforms at the designated points in the sample pulse generator 9A shown in FIGS. 4 and 5.

A timing diagram shown in FIG. 6 illustrates the operation of the sample pulse generator 9A of FIGS. 4 and 5. The signal indicated with each of the characters (a)–(u) in FIG. 6 is the same as that indicated in FIGS. 4 and 5.

Referring to FIG. 6, (h) illustrates the output writing signal WRDATA, in which the broken lines generally illustrate the waveform obtained by an optical power detecting system (including the photodiode 2 and the sensor amplifier 3).

As seen from this time diagram, if the output writing signal WRDATA has a shorter run than the predetermined time length (three or four cycles of the bit clock BCK; designated as "3T" or "4T"), the prohibiting signals FFH, FFL having a higher level prohibit the generation of the sample pulses SPH, SPL (the broken lines shown in (t) and (u) of FIG. 6 indicate the waveforms if the sample pulses are generated), so that the supply of the sample pulses to the sample-and-hold circuits 4H, 4L is blocked. In other words, the sample pulses SPH, SPL are only generated when the run is longer than the predetermined time length.

This causes the sample-and-hold circuits 4H and 4L to sample-and-hold the detection signal from the sensor amplifier 3 if only the writing pulse i.e. the writing signal has a longer run than the predetermined duration, while if the run has a shorter period than the predetermined period, the sample-and-hold operation can be eliminated. Due to the elimination of the above sample-and-hold action, it is possible to perform the precise sampling of the bottom power (lower level) and/or the writing power (higher level) of the writing signal or both of them, even when the circuit configuration and the circuit components theirselves in the sample-and-hold circuit and the light power detecting system lack their high frequency responses associated with a shorter run.

Described above, in the present embodiment, as for the writing pulse having a shorter run insufficient to sample, the optical detection signal based on the writing signal is ignored, the optical detection signal obtained by the writing signal i.e. the writing pulse having an effective longer run in the beam power control (servo) system is sampled. As a result, the bit rate of the writing signal may be accelerated compared with related conventional art in which the sampling from all of runs of the writing pulses is performed.

In FIG. 6, the duration from the trailing edge of the writing signal WRDATA to the leading edge of the sample pulse SPL corresponding to the writing pulse having the above trailing edge, and the duration from the leading edge of the writing signal WRDATA to the leading edge of the sample pulse SPH corresponding to the writing pulse having the above leading edge are equal to the amount of the time delay of the conventional delay circuit 92 shown in FIG. 2. The sample pulse generator in the present embodiment utilizes the shift resistor 910 instead of the delay circuit 91.

Figure 7:
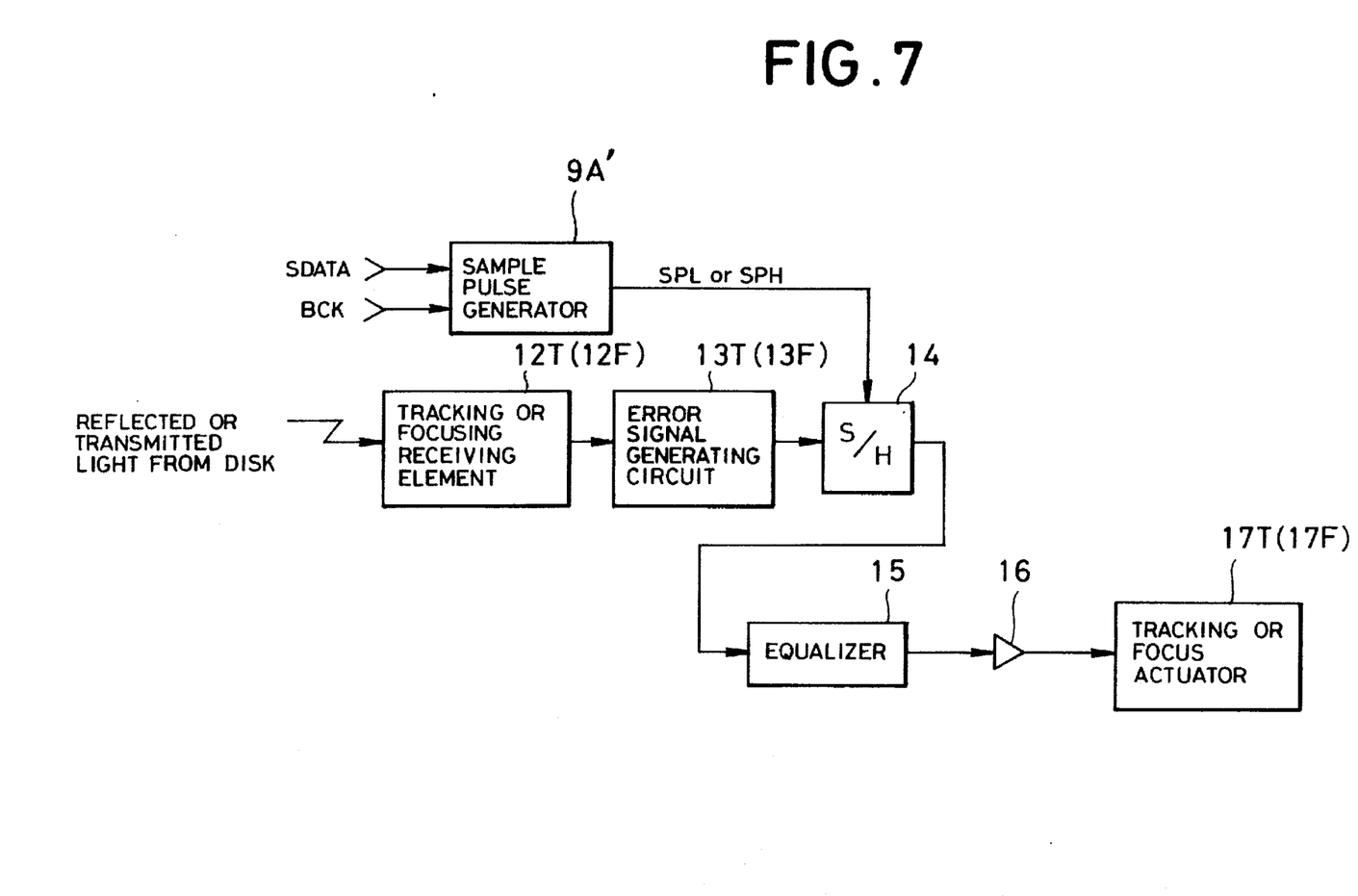
FIG. 7 is a functional block diagram showing tracking and focus servo loops utilizing a sample pulse generator according to the present invention.

The sample pulse generator 9A shown in FIGS. 4 and 5 may be suitable to tracking and focus servo controls of FIG. 7.

FIG. 7 illustrates a functional block diagram for a tracking and focus servo controls utilized in an optical disk recording apparatus, in which the similar component to that of FIGS. 4 and 5 is indicated with the same reference character.

In FIG. 7, a well-known receiving element 12T for tracking (or an element 12F for focusing) supplies its received output to a tracking error signal generating circuit 13T (or a focusing error signal generating circuit 13F), which produces a tracking error signal (or a focus error signal). The produced error signal is supplied to a sample-and-hold circuit 14. The sample-and-hold circuit 14 supplies its sample-and-hold output to a tracking actuator 17T (or focus actuator 17F) through an equalizer 15 and a driving amplifier 16.

A sample pulse generator 9A' generates a sample pulse being supplied to the sample-and-hold circuit 14. The sample pulse generator 9A" comprises the similar constituents to those of the sample pulse generator 9A in the prior embodiment, and transmits either a sample pulse SPH or a sample pulse SPL obtained by itself. The error signal from the generating circuit 13T (or 13F) is sampled in response to a run of the writing signal only when the run is longer than a predetermined time length.

Then, like the beam power control apparatus described above, if the run of the writing signal is shorter, the sample-and-hold operation of the sample-and-hold circuit 14 is prohibited and the output from the light receiving systems 12T and 12F is ignored. If the run is longer, the servo control serves effectively. As a result, the apparatus of the above embodiment solves the problems associated with not only the beam power servo control but also tracking and focus servo control, so that the bit rate of write signals can be accelerated.

Described above, in the apparatus according to the present invention, the supply of the sample pulse to the sample-and-hold circuit in the servo loop is blocked (or broken) when it is determined that the duration to have the lower and/or higher level of the writing signal i.e. an information signal is shorter than a predetermined time length, so that the bit rate of the writing signal can be accelerated independently of the improved response of the circuits and elements such as a sampling circuit and the light power detecting system.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. A beam power control apparatus for an optical disk recording system comprising:

beam generating means for emitting a recording beam irradiating onto an optical disk;

detecting means for detecting the light intensity of said recording beam and supplying the corresponding detection signal;

sample pulse generating means for determining the length of a duration of at least one of a lower level condition and a higher level condition in an information signal which is to be being recorded, said sample pulse generating means for generating a sample pulse corresponding to said duration only if it is determined that said duration is longer than a predetermined time length;

sample-and-hold means for sample-and-holding said detection signal in response to said sample pulse; and feedback control means for controlling the light intensity of at least one of the lower level condition and higher level condition of said recording beam, depending on said detection signal sample-and-held by said sample-and-hold means.

2. The beam power control apparatus as described in claim 1, wherein said beam generating means is driven to turn on and off in accordance with said information signal.

3. The beam power control apparatus as described in claim 2, wherein said sample pulse generating means comprises:

a shift resistor having a predetermined numbers of unit resistors connected in series to cause every bit of the original signal of said information signal to be shifted;

a logical circuit for generating a candidate pulse and a prohibiting signal based on the held outputs from said unit resistors, said candidate pulse corresponding to the duration of at least one of the lower and higher level conditions in said information signal having been obtained from the output terminal of said shift resistor, said prohibiting signal indicating during a predetermined period that said duration corresponds to the length of shorter bit numbers than that of the predetermined bit numbers; and a gate circuit for passing said candidate pulse as said sample pulse during the period in which said prohibiting signal dose not appear.

4. A tracking control apparatus for an optical disk recording system comprising:

beam generating means for emitting a recording beam irradiating on an optical disk;

detecting means for detecting a tracking error of said recording beam associated with a recording track on said optical disk to generate a corresponding error signal;

sample pulse generating means for determining the duration of a lower level condition or a higher level condition in an information signal which is to be recorded, said sample pulse generating means for generating a sample pulse corresponding to said duration only if it is determined that said duration is longer than a predetermined time length;

sample-and-hold means for sample-and-holding said error signal in response to said sample pulse; and feedback control means for controlling the tracking of said recording beam based on said error signal sample-and-held by said sample-and-hold means.

5. The tracking control apparatus as described in claim 4, wherein said beam generating means is driven to turn on and off in accordance with said information signal.

6. The tracking control apparatus as described in claim 5, wherein said sample pulse generating means comprises:

a shift resistor having the predetermined numbers of unit resistors connected in series to cause every bit of the original signal of said information signal to be shifted;

a logical circuit for generating a candidate pulse and a prohibiting signal based on the held outputs from said unit resistors, said candidate pulse corresponding to the duration of a lower level condition or a higher level condition in said information signal having been obtained from the output terminal of said shift resistor, said prohibiting signal indicating during a predetermined period that said duration corresponds to the length of shorter bit numbers than that of the predetermined bit numbers; and a gate circuit for passing said candidate pulse as said sample pulse during the period in which said prohibiting signal dose not appear.

7. A focusing control apparatus for an optical disk recording system comprising:

beam generating means for emitting a recording beam irradiating on an optical disk;

detecting means for detecting a focus error of said recording beam associated with a recording face on said optical disk to generate a corresponding error signal;

sample pulse generating means for determining the duration of a lower level condition or a higher level condition in an information signal which is to be recorded, said sample pulse generating means for generating a sample pulse corresponding to said duration only if it is determined that said duration is longer than a predetermined time length;

sample-and-hold means for sample-and-holding said error signal in response to said sample pulse; and feedback control means for controlling the focusing of said recording beam based on said error signal sample-and-held by said sample-and-hold means.

8. The focusing control apparatus as described in claim 7, wherein said beam generating means is driven to turn on and off in accordance with said information signal.

9. The focusing control apparatus as described in claim 8, wherein said sample pulse generating means comprises:

a shift resistor having the predetermined numbers of unit resistors connected in series to cause every bit of the original signal of said information signal to be shifted;

a logical circuit for generating a candidate pulse and a prohibiting signal based on the held outputs from said unit resistors, said candidate pulse corresponding to the duration of a lower level condition or a higher level condition in said information signal having been obtained from the output terminal of said shift resistor, said prohibiting signal indicating during a predetermined period that said duration corresponds to the length of shorter bit numbers than that of the predetermined bit numbers; and a gate circuit for passing said candidate pulse as said sample pulse during the period in which said prohibiting signal dose not appear.

* * * * *